(12) United States Patent
Droz et al.

(10) Patent No.: US 7,317,727 B2
(45) Date of Patent: Jan. 8, 2008

(54) METHOD AND SYSTEMS FOR CONTROLLING ATM TRAFFIC USING BANDWIDTH ALLOCATION TECHNOLOGY

(75) Inventors: Patrick Droz, Rueschlikon (CH); Ilias Iliadis, Rueschlikon (CH); Clark D. Jeffries, Durham, NC (US); Andreas Kind, Kilchberg (CH); Joseph F. Logan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 10/442,762

(22) Filed: May 21, 2003

(65) Prior Publication Data

US 2004/0233912 A1  Nov. 25, 2004

(51) Int. Cl.
*H04L 12/56* (2006.01)
*G01R 31/08* (2006.01)
*H04J 3/16* (2006.01)

(52) U.S. Cl. ............... 370/395.4; 370/235; 370/415; 370/468

(58) Field of Classification Search ............ 370/229, 370/230, 230.1, 235, 252, 395.1, 395.4, 395.41, 370/468, 477, 395.21, 413, 415
See application file for complete search history.

(56) References Cited

U.S. PATENT DOCUMENTS

| | | | |
|---|---|---|---|
| 5,838,681 A * | 11/1998 | Bonomi et al. ........ | 370/395.41 |
| 5,850,399 A | 12/1998 | Ganmukhi et al. | |
| 5,870,384 A | 2/1999 | Salovuori et al. | |
| 5,898,669 A | 4/1999 | Shimony et al. | |
| 5,914,936 A | 6/1999 | Hatono et al. | |
| 5,946,297 A | 8/1999 | Calvignac et al. | |
| 6,061,330 A | 5/2000 | Johansson | |
| 6,147,969 A | 11/2000 | Benmohamed et al. | |
| 6,205,151 B1 | 3/2001 | Quay et al. | |
| 6,229,789 B1 | 5/2001 | Simpson et al. | |
| 6,269,079 B1 | 7/2001 | Marin et al. | |
| 6,272,109 B1 | 8/2001 | Pei et al. | |
| 6,324,165 B1 | 11/2001 | Fan et al. | |
| 6,408,005 B1 * | 6/2002 | Fan et al. ................... | 370/412 |
| 6,452,933 B1 * | 9/2002 | Duffield et al. ............. | 370/415 |
| 6,657,960 B1 * | 12/2003 | Jeffries et al. ........... | 370/230.1 |
| 6,657,962 B1 * | 12/2003 | Barri et al. ................. | 370/235 |
| 6,674,718 B1 * | 1/2004 | Heddes et al. .............. | 370/230 |
| 6,771,652 B1 * | 8/2004 | Aydemir et al. ............ | 370/412 |
| 6,788,697 B1 * | 9/2004 | Aweya et al. ............... | 370/412 |
| 6,856,596 B2 * | 2/2005 | Blumer et al. .............. | 370/230 |
| 6,870,811 B2 * | 3/2005 | Barker et al. ............... | 370/235 |
| 7,002,980 B1 * | 2/2006 | Brewer et al. .............. | 370/414 |
| 7,107,344 B2 * | 9/2006 | Davis et al. ................ | 709/227 |

\* cited by examiner

*Primary Examiner*—Chris Kelley
*Assistant Examiner*—Peter L Cheng
(74) *Attorney, Agent, or Firm*—Sawyer Law Group LLP

(57) ABSTRACT

A method and system for managing asynchronous transfer mode (ATM) traffic in a computer system is disclosed. The computer system is used in sending, receiving, or sending and receiving a plurality of ATM flows. Each ATM flow has a plurality of ATM cells, a minimum ATM bandwidth guarantee, and a maximum ATM bandwidth. The method and system include determining whether excess bandwidth exists for the ATM flows. The method and system also include gracefully increasing a portion of the ATM cells transmitted for each ATM flow during periods of excess bandwidth. The portion of the ATM cells transmitted is not more than the maximum ATM bandwidth limit. If an ATM flow presents a sufficient offered load, the portion of the ATM cells transmitted in the flow is not less than a minimum ATM bandwidth guarantee.

36 Claims, 3 Drawing Sheets

METHOD AND SYSTEMS FOR CONTROLLING ATM TRAFFIC USING BANDWIDTH ALLOCATION TECHNOLOGY

CROSS-REFERENCE TO RELATED APPLICATIONS

The present invention is related to U.S. patent application Ser. No. 10/117,814, entitled "METHOD AND SYSTEM FOR PRIORITY ENFORCEMENT WITH FLOW CONTROL" and assigned to the assignee of the present invention, which has issued as U.S. Pat. No. 7,142,552. The present invention is also related to co-pending U.S. patent application Ser. No. 10/118,493, entitled "PRIORITY-BASED BANDWIDTH ALLOCATION WITHIN REAL-TIME AND NON-REAL-TIME TRAFFIC STREAMS" and assigned to the assignee of the present invention.

FIELD OF THE INVENTION

The present invention relates to computer systems, and more particularly to a method and system for managing asynchronous transfer mode (ATM) traffic.

BACKGROUND OF THE INVENTION

ATM is used in providing several types of communication traffic, particularly for traffic carried over long distances. In general, traffic in ATM can be conceived of virtual connections between networks. Each virtual connection could include many concurrent sessions, such as TCP/IP sessions.

Like traffic that is typically carried over the Internet, for example using DiffServ, ATM provides for different levels of service. In particular, ATM includes six service categories: constant bit rate (CBR), realtime variable bit rate (rt-VBR), non-realtime variable bit rate (nrt-VBR), unspecified bit rate (UBR), available bit rate (ABR), and guaranteed frame rate (GFR). In order to monitor the levels of service, ATM uses a generic cell rate algorithm (GCRA). A network administrator of a network receiving traffic uses the GCRA to determine whether the traffic offered is consistent with their service agreement and any quality of service parameters. The GCRA can be used by the sender to determine whether the network treats the traffic offered correctly. Stated differently, the GCRA allows the buyer or seller of ATM service to determine whether bandwidth bought or sold, which corresponds to the flows in the traffic within the network, conforms to a service agreement.

Furthermore, the six categories of ATM service can be described using several parameters. Peak cell rate (PCR) is the maximum bandwidth that can be allocated to a flow of a particular level of service. Cell delay variation tolerance (CDVT) is a jitter specification for a level of service. In addition, the sustainable cell rate (SCR) is a minimum bandwidth guarantee specified for a particular flow. Maximum burst size (MBS) is the maximum burst size allowed for the flow. The minimum cell rate (MCR) is the minimum bandwidth guarantee specified for the flow. The MCR is used only by the ABR and GFR levels of service. The Maximum frame size (MFS) is used only by GFR and, as the name indicates, specifies the maximum frame size for the GFR flow. Furthermore, a network administrator for a network using ATM specifies parameters including: peak-to-peak cell delay variation (peak-to-peak CDV) to specify the allowed jitter, the maximum cell transit delay (MaxCTD) to specify the allowed latency, and the cell loss rate (CLR) to specify the allowed cell loss rate.

Using the parameters above, ATM traffic can provide different levels of service. ATM standards do require that the parameters be met and that traffic may be monitored at the entrance and exit of each network. In other words, ATM specifies the goals, such as the MCR, to be met for each flow. However, ATM does not otherwise specify how traffic is controlled to meet the goals for each the above categories of service.

FIG. 1 depicts a conventional system 10 used in providing different levels of service for ATM traffic. The conventional system 10 is preferably used at the edge of a network (not explicitly shown). Thus, the conventional system 10 is used to ensure that flows entering and/or leaving the network conform to the parameters for each level of service. For clarity, the conventional system 10 is depicted as having five flows 20, 22, 24, 26, and 28. However, the conventional system 10 typically manages a large number of flows. The five flows 20, 22, 24, 26, and 28 include two realtime flows 20 and 22, and three non-realtime flows 24, 26, and 28. For example, the realtime flows 20 and 22 might be rt-VBR and CBR flows and the non-realtime flows 24, 26, and 28 might be nrt-VBR, UBR, and CBR flows. Each flow 20, 22, 24, 26, and 28 has a corresponding queue 30, 32, 34, 36, and 38 in which ATM cells may be stored prior to further processing.

The system 10 also includes a conventional scheduler 40 and an entrance to or exit from the network 42. Thus, the flows 20, 22, 24, 26, and 28 are either entering or exiting the network of which the conventional system 10 is a part. The conventional scheduler 40 also has knowledge of the ATM service category and, therefore, the parameters for each of the flows 20, 22, 24, 26, and 28. The conventional scheduler 40 monitors the traffic for each of the flows 20, 22, 24, 26, and 28. In particular, the conventional scheduler 40 monitors each packet, or cell, for each flow 22, 24, 26, and 28. Based upon the ATM service categories and parameters for the flows 20, 22, 24, 26, and 28, and the traffic in each of the flows 20, 22, 24, 26, and 28, the conventional scheduler 40 determines from which corresponding queue 30, 32, 34, 36, and 38, respectively, to select the next packet for processing. The conventional scheduler 40 thus selects an ATM cell from one of the queues 30, 32, 34, 36, or 38 and outputs the ATM cell to the entrance or exit from the network 42. Thus, ATM traffic having different levels of service can be managed.

Although the conventional method 10 functions, one of ordinary skill in the art will readily recognize that the conventional scheduler 40 is complex. The conventional scheduler 40 understands the ATM service category for each flow 20, 22, 24, 26, and 28. The conventional scheduler 40 also obtains data relating to each ATM cell in each flow 20, 22, 24, 26, and 28. Thus, the conventional scheduler 40 must monitor the flow of each packet out of each queue 30, 32, 34, 36, and 38. The conventional scheduler 40 also transmits packets for each flow 20, 22, 24, 26, and 28 such that the ATM service parameters are met for each flow 20, 22, 24, 26, and 28. In order to perform all of these services on the individual ATM cell level, the conventional scheduler 40 is complex.

Furthermore, the conventional ATM scheduler 40 does not in itself provide for a mechanism to discard excess traffic. Discards may be managed by comparing the occupancy of Queue 1 30 with a threshold and discarding arriving traffic if and only if the threshold is exceeded. The same policy may be applied to Queue 2 32 and so on. However, if such a threshold has a relatively low value, then bursts of traffic may be unnecessarily discarded; if a threshold has relatively high value, then during an episode of steady congestion, all surviving packets may have undesirably high queueing latency. Therefore, setting discard thresholds may present the administrator with burdensome and confusing performance requirements. Consequently, providing different levels of ATM services in a conventional manner may be relatively difficult and inefficient.

Accordingly, what is needed is a system and method for providing better management of different levels of ATM services. The present invention addresses such a need.

SUMMARY OF THE INVENTION

The present invention provides method and system for managing asynchronous transfer mode (ATM) traffic in a computer system. The computer system is used in sending, receiving, or sending and receiving a plurality of ATM flows. Each of the plurality of ATM flows has a plurality of IP packets consisting of ATM cells. The method and system comprise determining whether excess bandwidth exists for the plurality of ATM flows. Each of the plurality of ATM flows has a minimum ATM bandwidth guarantee and a maximum ATM bandwidth. The method and system also comprise gracefully increasing a portion of the plurality of ATM cells transmitted for each ATM flow of a portion the plurality of ATM flows having excess bandwidth existing. The portion of the plurality of ATM cells transmitted is not more than the maximum ATM bandwidth limit. If the plurality of ATM cells presents a sufficient offered load, the portion of the plurality of ATM cells transmitted is not less than a minimum ATM bandwidth guarantee.

According to the system and method disclosed herein, the present invention allows ATM traffic to be efficiently managed.

DETAILED DESCRIPTION OF THE INVENTION

The present invention relates to an improvement in computer systems and computer networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides method and system for managing asynchronous transfer mode (ATM) traffic in a computer system. The computer system is used in sending, receiving, or sending and receiving a plurality of ATM flows. Each of the plurality of ATM flows has a plurality of ATM cells. The method and system comprise determining whether excess bandwidth exists for the plurality of ATM flows. Each of the plurality of ATM flows has a minimum ATM bandwidth guarantee (possibly zero) and a maximum ATM bandwidth limit. The method and system also comprise gracefully increasing a portion of the plurality of ATM cells transmitted for each ATM flow of a portion the plurality of ATM flows having excess bandwidth existing. The portion of the plurality of ATM cells transmitted is not more than the maximum ATM bandwidth limit. If the plurality of ATM cells presents a sufficient offered load, the portion of the plurality of ATM cells transmitted is not less than a minimum ATM bandwidth guarantee.

According to the system and method disclosed herein, the present invention allows ATM traffic to be managed gracefully and efficiently. In addition, high utilization of the processing resources and low queueing latency during steady congestion may be ensured while allowing for excess bandwidth to be allocated fairly among different flows.

The present invention will be described in terms of particular computer systems. However, one of ordinary skill in the art will readily recognize that this method and system will operate effectively for other and/or additional computer systems having different and/or additional components. The present invention is described in the context of systems located at the edges of networks. However, one of ordinary skill in the art will readily recognize that the computer systems could be located elsewhere. In addition, the present invention is described in the context of queues. However, one of ordinary skill in the art will readily recognize that each queue could be a logical partition of a single resource. Furthermore, the present invention is described in the context of methods having certain steps performed in a particular order. However, nothing prevents the use of methods having other and/or additional steps and/or a different order of steps not inconsistent with the present invention.

Figure 1:
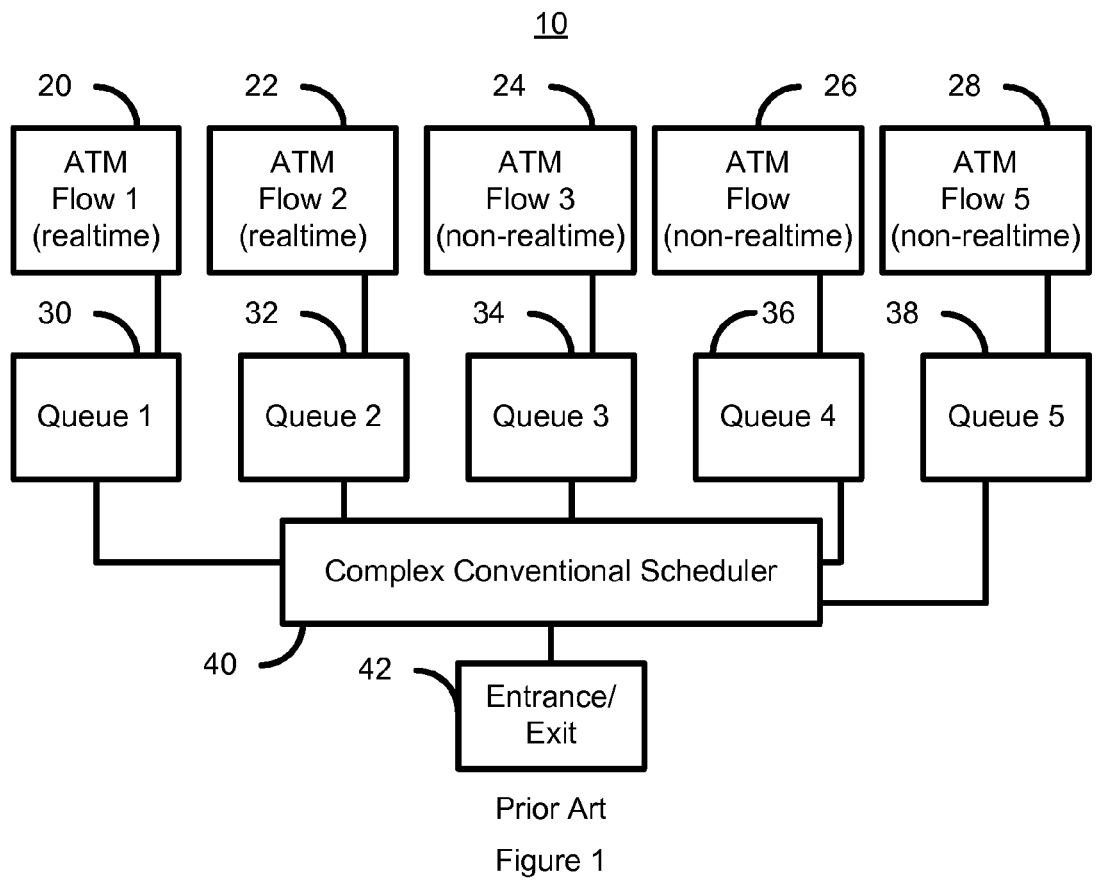
FIG. 1 is a block diagram of a conventional system for managing ATM traffic
Figure 2:
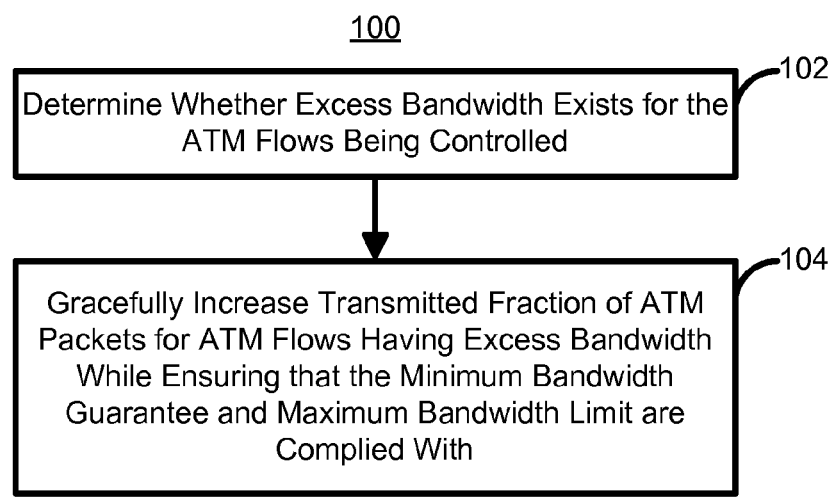
FIG. 2 is a high-level flow chart depicting one embodiment of a method in accordance with the present invention for managing ATM traffic, preferably using a switch.

To more particularly illustrate the method and system in accordance with the present invention, refer now to FIG. 2, depicting one embodiment of a method 100 for managing ATM traffic having different service categories. The method 100 is preferably accomplished using technology described in co-pending U.S. patent application Ser. No. 10/117,814, entitled "METHOD AND SYSTEM FOR PRIORITY ENFORCEMENT WITH FLOW CONTROL" and assigned to the assignee of the present invention, which has issued as U.S. Pat. No. 7,142,552, and co-pending U.S. patent application Ser. No. 10/118,493, entitled "PRIORITY-BASED BANDWIDTH ALLOCATION WITHIN REAL-TIME AND NON-REAL-TIME TRAFFIC STREAMS" and assigned to the assignee of the present invention. Applicants hereby incorporate by reference the above-mentioned co-pending U.S. Patent Applications.

The method 100 can be used with a switch (not shown) such as a switch having multiple blades (not shown) and multiple ports on each blade. The method 100 could also be used on another system. In a preferred embodiment, the method 100 is implemented in enqueueing mechanism(s) for one or more queues.

The method 100 is preferably repeated at a constant frequency, each time a refresh period has expired. It is also preferably used to manage ATM traffic at the edge of a network. Thus, the switch or other mechanism implementing the method 100 is preferably located at the edge of a network and provides ATM traffic to or from an external destination or source, respectively. The method 100 will, therefore, be described in the context of the network receiving or sending ATM cells at the network's edge. However, nothing prevents the method 100 from being used in another portion of the network (not shown), between individual hosts or between networks (not shown).

The method 100 preferably commences after the network administrator for the network (not shown), or other authorized user, has set a minimum bandwidth guarantee and maximum bandwidth limit for each flow of ATM cells that is to be controlled. The method 100 also preferably commences after any remaining parameters for each of the ATM flows has been set. Thus, for flows added after the method 100 initially starts, the method 100 preferably controls traffic for the flow only after the minimum bandwidth guarantee and maximum bandwidth limit are set. The minimum bandwidth guarantee is greater than or equal to zero. The minimum bandwidth guarantee and the maximum bandwidth limit depend upon the ATM service category. For example, for a CBR flow, the minimum bandwidth guarantee and the maximum bandwidth limit are preferably set to the same level, the PCR. For rt-VBR, the minimum bandwidth guarantee is preferably set to SCR, while the maximum bandwidth limit is preferably set to PCR. PCR is greater than SCR for rt-VBR. In addition, the MBS for rt-VBR is preferably set by the administrator prior to the method 100 being used to control the flow. For UBR, the minimum bandwidth guarantee is set equal to zero or, in a preferred embodiment, slightly greater than zero. The minimum bandwidth guarantee is preferably set slightly greater than zero so that there is always a trickle of ATM traffic when ATM traffic is offered for the UBR flow, which may make debugging simpler. In addition, a network administrator may set an optional minimum desired cell rate and associate the flow with a class through a behavior class selector attribute. For ABR, the network administrator preferably sets the minimum bandwidth guarantee equal to the MCR and the maximum bandwidth limit to PCR. For ABR, MCR is less than PCR. For ABR, congestion control feedback and the minimum per hop bandwidth value may also be set. For GFR, the minimum bandwidth guarantee and maximum bandwidth limit are set to MCR and PCR, respectively. Furthermore, MFS and early packet discard (EPD) can also be implemented for GFR in conjunction with the method 100. EPD ensures that if one ATM cell, which may be part of a larger IP packet, is discarded, the remaining ATM cells for the IP packet are also discarded. In addition, in order to ensure that the computer system can handle the traffic through the system, the sum of the maximum bandwidth limits for ATM flows of realtime traffic plus a sum of the minimum bandwidth guarantees for ATM flows corresponding of non-realtime traffic is less than or equal to a maximum capacity of the computer system.

Whether excess bandwidth exists for the ATM flows being controlled is determined, via step 102. The determination of excess bandwidth is made based upon the ATM flows, rather than by monitoring individual packets in the ATM flows. In a preferred embodiment, the ATM cells in the ATM flows are being provided to one or more queues. Whether excess bandwidth exists for a particular ATM flow is preferably determined based upon one or more of the following: the occupancy in the corresponding queue(s), the rate of change of occupancy in the queue(s), and the flow rate for the particular ATM flow. For example, when the corresponding queue(s) is below a particular threshold, preferably expressed as a percentage of occupancy of the queue, excess bandwidth exists. When the occupancy of the queue is below a larger threshold and decreasing at a particular rate, excess bandwidth also exists. Otherwise excess bandwidth may be considered not to exist. The thresholds and rates of decrease may be selected based upon the application.

In a preferred embodiment, step 102 determines whether excess bandwidth exists once for all realtime ATM traffic and once for all non-realtime ATM traffic. Thus, in a preferred embodiment, step 102 includes monitoring one queue that stores realtime traffic and monitoring another queue that stores non-realtime traffic, then determining whether excess bandwidth exists for the corresponding flows. Thus, the determination of excess bandwidth is preferably the same for all ATM flows that include realtime traffic. Similarly, the determination of excess bandwidth is preferably the same for all ATM flows that include non-realtime traffic. However, nothing prevents the use of a finer definition of excess bandwidth flow by flow based upon a larger number of queues and/or organizing the queues differently. In addition, the determination of excess bandwidth in step 102 is not based upon monitoring of individual ATM cells. Instead, queue statistics or other indicator of the flow of ATM traffic for the ATM flows is used.

If it is determined that excess bandwidth exists for certain ATM flows, then the flow rate of ATM cells transmitted for these flows is gracefully increased, via step 104. A graceful increase or decrease occurs when the flow rate is gradually increased or decreased, respectively, toward the upper limit (maximum bandwidth limit) or lower limit (minimum bandwidth guarantee), respectively. This could include linearly or exponentially increasing or decreasing the flow rate of the ATM cells transmitted.

Also in step 104, it is ensured that the transmission of ATM cells for these flows is such that enough ATM cells are transmitted to meet the minimum bandwidth guarantee if a sufficient load is offered. In other words, the minimum bandwidth guarantee is met as long as enough ATM cells are in the flow. If a sufficient load is not offered, then the flow may have less than the minimum bandwidth guarantee. Also in a preferred embodiment, the ATM flows are controlled so that the ATM cells transmitted are not more than the maximum bandwidth limit. This means that each ATM flow is preferably controlled so that the ATM cells transmitted are reduced when the ATM cells transmitted for the flow exceed the maximum bandwidth limit. In a preferred embodiment, the number of ATM cells transmitted for each realtime ATM flow will increase when there is excess bandwidth for realtime traffic and when the maximum bandwidth limit for the realtime traffic is not exceeded.

In a preferred embodiment, step 104 is performed by linearly increasing the transmit fraction for each ATM flow for which excess bandwidth exists, exponentially decreasing the transmit fraction for ATM flows having flow rates greater than the maximum bandwidth limit, and using the transmit fraction to determine whether to discard individual ATM cells for the ATM flows. The transmit fraction may be zero (transmit no packets), one (transmit all packets) or some value between zero and one. Thus, in a preferred embodiment, when a packet arrives, the current value of a random number generator (not explicitly shown) is fetched. This current random number is also zero, one or some value between zero and one. The current random number is compared to the transmit fraction. The ATM cell is transmitted when the transmit fraction for the corresponding ATM flow is greater than or equal to the current random number. Otherwise, the ATM cell is discarded. As the transmit fraction for an ATM flow is increased in step 104, there is a greater probability that an ATM cell is transmitted. In one embodiment, individual ATM cells are transmitted or discarded without regard to any IP packets of which the ATM cells are a part. However, in another embodiment, EPD is used so that if one ATM cell of an IP packet is discarded, the remaining ATM cells for the IP packet will also be discarded.

Thus, using the method 100, ATM traffic can be gracefully controlled based upon the available bandwidth. In a preferred embodiment, the determination of whether available bandwidth exists is not based upon monitoring individual ATM cells, but instead is based upon a simpler measure, such as queue statistics. Individual packets need not be monitored in order to provide different categories of ATM service. As a result, different ATM flows belonging to different categories of service and having different ATM parameters may be efficiently and more simply controlled.

Figure 3:
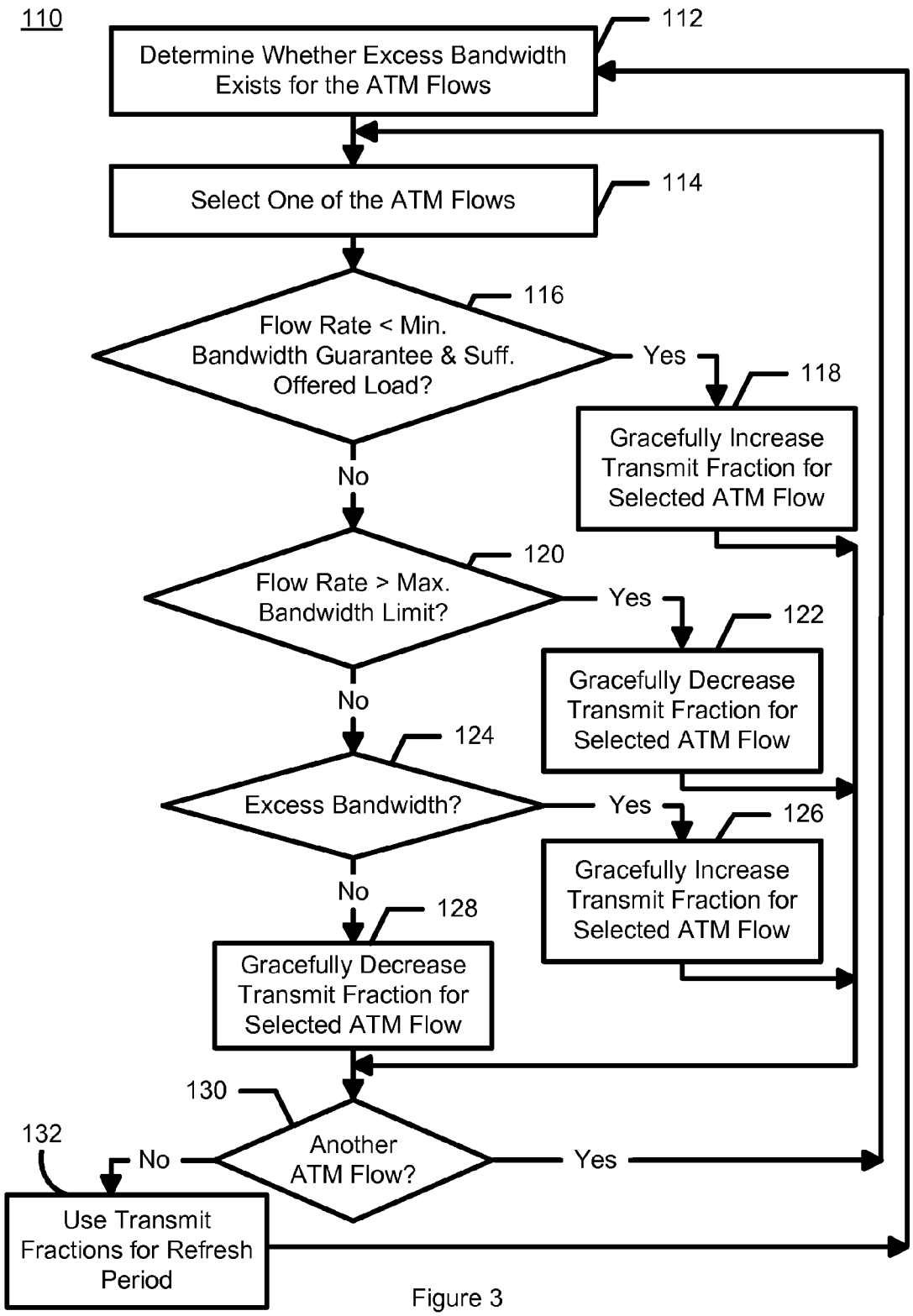
FIG. 3 is a more detailed flow chart depicting one embodiment of a method in accordance with the present invention for managing ATM traffic.

FIG. 3 is a more detailed flow chart depicting one embodiment of a method 110 in accordance with the present invention for managing ATM traffic. The method 110 is preferably one implementation of the method 100. The method 110 is preferably accomplished using technology described in the above-identified co-pending U.S. patent applications. The method 110 can be used with a switch (not shown) or other mechanism. In a preferred embodiment, the method 110 is implemented in enqueueing mechanism(s) for one or more queues.

The method 110 preferably commences after the network administrator for the network (not shown), or other authorized user, has set a minimum bandwidth guarantee and maximum bandwidth limit for each flow of ATM cells that is to be controlled. The method 110 also preferably commences after remaining parameters for each of the ATM flows has been set. Thus, for flows added after the method 110 initially starts, the method 110 preferably controls traffic for the flow only after the minimum bandwidth guarantee and maximum bandwidth limit are set. The minimum bandwidth guarantee and maximum bandwidth limit for different ATM service categories are preferably set in a similar manner to the method 100 of FIG. 2. Referring back to FIG. 3, the method 110 is preferably performed for each ATM flow that is being controlled. Each flow rate has a minimum bandwidth guarantee and a maximum bandwidth limit.

The method 110 is preferably repeated at a constant frequency, each time a refresh period has expired. It is also preferably used to manage ATM traffic at the edge of a network. Thus, the switch or other mechanism implementing the method 110 is preferably located at the edge of a network and provides ATM traffic to or from an external destination or source, respectively. The method 110 will, therefore, be described in the context of the network receiving or sending ATM cells at the network's edge. However, nothing prevents the method 110 from being used in another portion of the network (not shown), between individual hosts or between networks (not shown).

It is determined whether excess bandwidth exists for each of the ATM flows, via step 112. In a preferred embodiment, step 112 is not performed by monitoring individual ATM cells in each ATM flow. Instead, as described above with respect to the method 100, step 112 preferably utilizes queue statistics in order to determine whether bandwidth exists for the ATM flows. In a preferred embodiment, step 112 determines whether excess bandwidth exists once for all realtime ATM traffic and once for all non-realtime ATM traffic. Thus, in a preferred embodiment, step 112 includes monitoring one queue that stores realtime traffic and monitoring another queue that stores non-realtime traffic, then determining whether excess bandwidth exists for the corresponding flows. Thus, the determination of excess bandwidth is preferably the same for all ATM flows that include realtime traffic. Similarly, the determination of excess bandwidth is preferably the same for all ATM flows that include non-realtime traffic. However, nothing prevents the use of a different number of queues and/or organizing the queues differently. Note that the determination of excess bandwidth in step 112 is not based upon monitoring of individual ATM cells. Instead, queue statistics or other indicator of the flow of ATM traffic for the ATM flows is used.

In a preferred embodiment, step 112 also includes providing an excess bandwidth signal, B, and an average excess bandwidth signal, E. The excess bandwidth signal B is one when excess bandwidth exists and zero when excess bandwidth is not available. The average excess bandwidth signal, E, is preferably an exponentially weighted moving average of B. Thus, E is greater than or equal to zero and less than or equal to one. B and E are calculated each refresh period.

One of the ATM flows is selected, via step 114. It is determined whether the flow rate of ATM cells transmitted for the selected ATM flow is less than the minimum bandwidth guarantee for the selected flow, via step 116. If so, then the transmit fraction for the selected ATM flow is gracefully increased toward one, via step 118. A graceful increase or decrease occurs when the transmit fraction is gradually increased or decreased, respectively, toward the upper limit (1) or lower limit (0), respectively. In a preferred embodiment, the transmit fraction is linearly increased in step 118. Thus, the flow rate of transmitted ATM cells for the selected ATM flow should increase over the refresh period.

If the flow rate for transmitted ATM cells is not less than the minimum bandwidth guarantee, then it is determined whether the flow rate of ATM cells transmitted is greater than the maximum bandwidth limit, via step 120. If the flow rate of ATM cells transmitted is greater than the maximum bandwidth limit, then the transmit fraction is gracefully decreased toward zero. Preferably, this graceful decrease includes exponentially decreasing the transmit fraction. Thus, the flow rate of transmitted ATM cells for the selected ATM flow should decrease over the refresh period. Thus, using step 120, the flow rate of transmitted ATM cells can effectively be prevented from being greater than the maximum bandwidth limit.

If the flow rate for transmitted ATM cells is not more than the maximum bandwidth limit, then it is determined whether there is excess bandwidth available for the ATM flow, via step 124. Step 124 preferably includes determining whether B is a one for the selected ATM flow. As discussed above, the excess bandwidth availability is determined for realtime and non-realtime ATM flows. Thus, for example, if B is a one for one realtime flow, then B will be a one for all realtime ATM flows. If there is excess bandwidth available, then the transmit fraction is gracefully increased, via step 126. In a preferred embodiment, step 126 includes linearly increasing the transmit fraction for the selected ATM flow if excess bandwidth is available. Also in a preferred embodiment, the amount that the transmit fraction increases depends upon E and, therefore, upon how long excess bandwidth has been available. When calculated using step 126, the transmit fraction for the current refresh period is preferably:

$$T_j = T_{j-1} - E*C_i$$

where:

$C_i$=constant selected for the ith ATM flow $T_j$=transmit fraction for the selected ATM flow for the current refresh period $T_{j-1}$=transmit fraction for the selected ATM flow for the previous refresh period In a preferred embodiment, the constant, $C_i$, for the flow is preferably selected based upon the priority of the flow. If different ATM flows have different priorities, the $C_i$'s are different. Suppose the priorities correspond to P=0, 1, 2, 3, 4, . . . The highest priority, P=0, preferably has the highest $C_0$. In a preferred embodiment, ATM flows having the highest priority have $C_0$=1/128. Lower priority ATM flows have lower constants. Preferably $C_{i+1}=C_{i/2}$. Thus, $C_1$=1/256, $C_2$=1/512 and so on. As a result, the higher priority ATM flows will increase their transmission fraction in step 126 more quickly than lower priority ATM flows. Higher priority ATM flows take excess bandwidth more readily than lower priority flows.

If there is no excess bandwidth available, then the transmit fraction is gracefully decreased, via step 128. In a preferred embodiment, step 128 includes exponentially decreasing the transmit fraction for the selected ATM flow if excess bandwidth is not available. Thus, the amount that the transmit fraction decreases depends upon the transmit fraction for the previous period. When calculated using step 128, the transmit fraction for the current refresh period is preferably:

$$T_j = T_{j-1} - f_{j-1} * D_i$$

where:

$D_i$=constant selected for the ith ATM flow $T_j$=transmit fraction for the selected ATM flow for the current refresh period $T_{j-1}$=transmit fraction for the selected ATM flow for the previous refresh period $f_{j-1}$=transmitted flow rate for the selected ATM flow for the previous refresh period expressed as a fraction of the physical rate observed divided by the maximum possible physical rate (a constant)

In a preferred embodiment, the constant, $D_i$, for the flow is preferably selected based upon the priority of the flow. If different ATM flows have different priorities, the $D_i$'s are different. Suppose the priorities correspond to P=0, 1, 2, 3. The ATM flow with priority 3 has the lowest priority. In a preferred embodiment, ATM flows having the highest priority have $D_0$=1/32. Lower priority ATM flows have larger constants. Preferably $D_{i-1}=D_i*2$ (where * denotes multiplication). Thus, $D_1$=1/16, $D_2$=1/8 and $D_3$=1/4. As a result, the higher priority ATM flows will decrease their transmission fraction in step 128 more slowly than lower priority ATM flows. Higher priority ATM flows retain their bandwidth to a greater extent than lower priority flows.

Once the transmit fraction is set in step 118, 122, 126, or 128, it is determined whether there are any other ATM flows for which the transmit fraction is to be set, via step 130. If so, then step 114, selecting the next ATM flow, is returned to. If the transmit fraction has been set for all ATM flows, then the transmit fractions are stored for use in determining whether to transmit or discard packets in the ATM flows during the refresh period, via step 132. The same stored transmit fraction are also used to calculate the next transmit fraction values. In a preferred embodiment, the transmit fraction is compared to a random number in step 132, as described above. If the transmit fraction is greater than the random number, then the ATM cell is transmitted. Otherwise, the ATM cell is dropped. In one embodiment, EPD is used to drop other ATM cells in the same IP packet. When the refresh period has expired, then step 112 is returned to.

Thus, using the method 110, ATM traffic can be gracefully controlled based upon the available bandwidth. The determination of whether available bandwidth exists is not based upon monitoring individual ATM cells, but instead is based upon a simpler measure, such as queue statistics. As a result, different ATM flows belonging to different categories of service and having different ATM parameters may be efficiently and more simply controlled.

Figure 4:
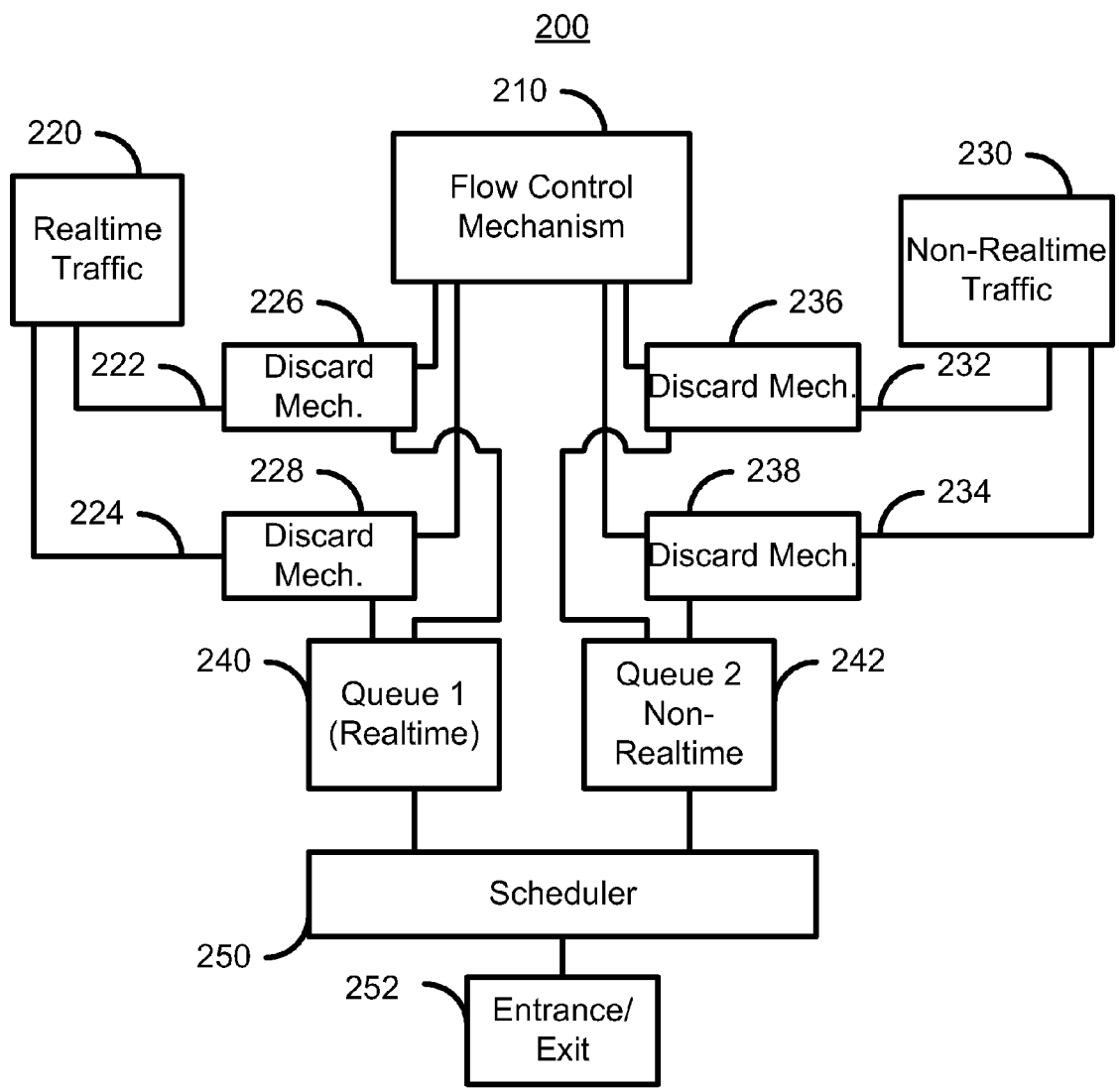
FIG. 4 is a block diagram of one embodiment of a system in accordance with the present invention for managing ATM traffic.

FIG. 4 is a block diagram of one preferred embodiment of a system 200 in accordance with the present invention for managing ATM traffic. The system 200 preferably implements the methods 100 and/or 110. The system 200 includes a flow control mechanism 210, ATM flows 222, 224, 232, and 234 from realtime traffic 220 and non-realtime traffic 230, discard mechanisms 226, 228, 236, and 238 that are pictured as valves. The system 200 also includes queues 240 and 242, scheduler 250 and an entrance/exit 252 for the network of which the system 200 is a part. The ATM flows 222 and 224 are for realtime traffic. The ATM flows 232 and 234 are non-realtime flows. For exemplary purposes, the system 200 is shown as controlling four ATM flows 222, 224, 232, and 234. However, nothing prevents the use of another number of ATM flows. In a preferred embodiment, the flow control mechanism 210 is an enqueueing mechanism 210 that uses discard mechanisms 226, 228, 236, and 238 to transmit or discard ATM cells traveling toward the queues 240 and 242. The first queue 240 is for realtime traffic, while the second queue 242 is for non-realtime traffic.

The flow control mechanism 210 implements at least a portion of the method 100 and/or 110. Thus, the flow control mechanism 210 determines whether excess bandwidth exists and, in a preferred embodiment, adjusts the transmission fractions for the ATM flows 222, 224, 232, and 234 accordingly. In a preferred embodiment, the enqueueing mechanism 210 determines whether excess bandwidth exists for all realtime traffic 220. The enqueueing mechanism preferably makes this determination based upon the statistics for the queue 240. For example, the enqueueing mechanism 210 may determine that excess bandwidth exists when the occupancy of the queue 240 is below a certain threshold, such as ten percent occupancy, or when the occupancy of the queue 240 is below twenty percent occupancy and decreasing. Thus, the enqueueing mechanism preferably implements steps 102 and/or 112 of the methods 100 and 110, respectively.

The enqueueing mechanism 210 controls the discard mechanisms 226, 228, 236, and 238 to transmit or discard ATM cells for the ATM flows 222, 224, 232, and 236 based upon the existence of excess bandwidth. In a preferred embodiment, the enqueueing mechanism 210 updates the transmit fraction for each of the ATM flows 222, 224, 232, and 234 based upon whether excess bandwidth exists. In a preferred embodiment, the transmit fraction for the ATM flows 222 and 224 will be updated in a similar manner because these ATM flows 222 and 224 both include realtime traffic. Similarly, the transmit fraction for the ATM flows 232 and 234 will be updated in a similar manner because these ATM flows 232 and 234 both include non-realtime traffic. However, the values of the transmit fraction for the ATM flows 222, 224, 232, and 234 may differ. Thus, the ATM flows 222, 224, 232, and 234 may take up or relinquish bandwidth to a different extent.

In addition, the enqueueing mechanism 210 ensures that certain parameters are met so that the system 200 can adequately handle the ATM traffic through the network (not shown). The enqueueing mechanism 210 preferably ensures that the minimum rate of each flows is actually allocated, if the flow offers at least that much traffic, and that the maximum rates of each flow is enforced, if the flow offers more than its maximum rate.

ATM cells that are transmitted are provided to the queue 240 or the queue 242. The queues 240 and 242 preferably output ATM cells in first-in-first-out (FIFO) order. The scheduler 250 selects ATM cells from the queue 240 or 242 and outputs the ATM cell to the entrance/exit 252. In a preferred embodiment, the scheduler 250 only takes an ATM cell from the queue 242 holding non-realtime traffic when the queue 240 is empty. Thus, the realtime traffic will be more rapidly processed. However, in another embodiment, the scheduler 250 may take packets from the queue 242 more often, for example when the queue 240 reaches a certain, low threshold. Consequently, the scheduler 250 does not determine whether and when to discard ATM cells.

Because the enqueueing mechanism 210 controls the admission of ATM cells into the queues 240 and 242, the occupancies of the queues 240 and 242 may be lower than if the scheduler 250 performed the above-described flow control based upon discard actions triggered by flow queue occupancy exceeding a threshold, especially if the threshold is set at a high value for the purpose of tolerating bursts. Consequently, the queues 240 and 242 generally have a lower occupancy and, therefore, a lower latency. In addition, because the enqueueing mechanism controls the transmission of ATM cells based upon queue statistics, the enqueueing mechanism 210 need not monitor each ATM cell entering the system 200. In addition, the scheduler 250 does not determine whether to discard ATM cells for each flow. Thus, the scheduler 250 is simpler and more efficient. Furthermore, because of the use of the enqueueing mechanism 210 in conjunction with the simpler scheduler 250, the maximum delay a realtime packet suffers due to non-realtime processing is the maximum size of a non-realtime data unit divided by the service rate. For ATM cells having a size of fifty-three bytes and a service rate of one hundred megabits per second, this delay is much less than one hundred milliseconds. Thus, use of the system 100 and, in a preferred embodiment, the methods 100 and/or 110, the processing of non-realtime traffic does not adversely affect the processing of realtime traffic.

Thus, using the methods 100 and 110 and/or the system 200, ATM traffic can be gracefully and efficiently managed. In addition, the manner in which ATM cells are discarded and bandwidth is allocated allows for high utilization, low latency, fast convergence to a desired allocation and fair allocation of excess bandwidth between different ATM flows.

A method and system has been disclosed for managing ATM traffic. Software written according to the present invention is to be stored in some form of computer-readable medium, such as memory, CD-ROM, or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing asynchronous transfer mode (ATM) traffic in a computer system, the computer system used in sending, receiving, or sending and receiving a plurality of ATM flows, each of the plurality of ATM flows having a plurality of ATM cells, the method comprising:
   determining whether excess bandwidth exists for the plurality of ATM flows, each of the plurality of ATM flows having a minimum ATM bandwidth guarantee and a maximum ATM bandwidth limit;
   gracefully increasing a portion of the plurality of ATM cells transmitted for each ATM flow having excess bandwidth,
   for each ATM flow having excess bandwidth, the portion of the plurality of ATM cells transmitted is not more than the maximum ATM bandwidth limit of the ATM flow and, responsive to the plurality of ATM cells presenting a sufficient offered load, the portion of the plurality of ATM cells transmitted is not less than the minimum ATM bandwidth guarantee of the ATM flow; and
   outputting the portion of the plurality of ATM cells transmitted for each ATM flow having excess bandwidth using a scheduler, wherein
   each of the plurality of ATM flows corresponds to real-time traffic or non-realtime traffic,
   for each ATM flow having excess bandwidth, the portion of the plurality of ATM cells are transmitted to a first queue for the realtime traffic or a second queue for the non-realtime traffic, and
   a first sum of the maximum ATM bandwidth limit for each of the plurality of ATM flows corresponding to realtime traffic plus a second sum of the minimum ATM bandwidth guarantee for each of the plurality of ATM flows corresponding to non-realtime traffic is less than or equal to a maximum capacity of the computer system.

2. The method of claim 1, wherein the portion of the plurality of ATM cells is transmitted based upon a transmission fraction between zero and one, and wherein gracefully increasing the portion of the plurality of ATM cells further includes:
   linearly increasing the transmission fraction towards one.

3. The method of claim 2, wherein the excess bandwidth is determined over a refresh period, the excess bandwidth being represented by an excess bandwidth signal, and wherein linearly increasing the transmission fraction further includes:
   adding a product of an exponentially weighted moving average of the excess bandwidth signal and a constant for the plurality of ATM cells to the transmission fraction for a previous refresh period.

4. The method of claim 1, further comprising:
   gracefully decreasing the portion of the plurality of ATM cells transmitted if the excess bandwidth does not exist.

5. The method of claim 4, wherein the portion of the plurality of ATM cells is transmitted based upon a transmission fraction between zero and one, and wherein gracefully decreasing the portion of the plurality of ATM cells further includes:
   exponentially decreasing the transmission fraction towards zero by subtracting a term from a previous transmission fraction of a previous refresh period to obtain a current transmission fraction for a current refresh period.

6. The method of claim 5, wherein the excess bandwidth is determined over a refresh period, the excess bandwidth being represented by an excess bandwidth signal, and wherein exponentially decreasing the transmission fraction further includes:
  computing the term by multiplying a constant and a ratio of an observed transmitted rate for the previous refresh period divided by a constant physical limit that any of the plurality of ATM flows could attain.

7. The method of claim 1, wherein the computer system includes at least one queue, and wherein determining whether excess bandwidth exists further includes:
  utilizing a queue occupancy and a rate of change of queue occupancy to determine whether excess bandwidth exists.

8. The method of claim 1, wherein the computer system includes a queue and wherein determining whether excess bandwidth exists further includes:
  determining excess bandwidth exists if the queue is less than a particular occupancy level.

9. The method of claim 1, further comprising:
  increasing the portion of the plurality of ATM cells transmitted if the portion of the plurality of ATM cells transmitted is less than the minimum ATM bandwidth guarantee and the plurality of ATM cells present the sufficient offered load.

10. The method of claim 1, further comprising:
  decreasing the portion of the plurality of ATM cells transmitted if the portion of the plurality of ATM cells transmitted is greater than the maximum ATM bandwidth limit.

11. The method of claim 1, wherein outputting the portion of the plurality of ATM cells further includes:
  selecting an ATM cell from the second queue only if the first queue is empty.

12. The method of claim 1, wherein each of the plurality of ATM flows have a corresponding priority and wherein outputting the portion of the plurality of ATM cells further includes:
  outputting the portion of the plurality of ATM cells based upon the corresponding priority.

13. A computer-readable medium including a program for managing asynchronous transfer mode (ATM) traffic in a computer system, the computer system used in sending, receiving, or sending and receiving a plurality of ATM flows, each of the plurality of ATM flows having a plurality of ATM cells, the program including computer-executable instructions for:
  determining whether excess bandwidth exists for the plurality of ATM flows, each of the plurality of ATM flows having a minimum ATM bandwidth guarantee and a maximum ATM bandwidth limit;
  gracefully increasing a portion of the plurality of ATM cells transmitted for each ATM flow having excess bandwidth,
  for each ATM flow having excess bandwidth, the portion of the plurality of ATM cells transmitted is not more than the maximum ATM bandwidth limit of the ATM flow and, responsive to the plurality of ATM cells presenting a sufficient offered load, the portion of the plurality of ATM cells transmitted is not less than the minimum ATM bandwidth guarantee of the ATM flow; and
  outputting the portion of the plurality of ATM cells transmitted for each ATM flow having excess bandwidth using a scheduler, wherein
  each of the plurality of ATM flows corresponds to realtime traffic or non-realtime traffic,
  for each ATM flow having excess bandwidth, the portion of the plurality of ATM cells are transmitted to a first queue for the realtime traffic or a second queue for the non-realtime traffic, and
  a first sum of the maximum ATM bandwidth limit for each of the plurality of ATM flows corresponding to realtime traffic plus a second sum of the minimum ATM bandwidth guarantee for each of the plurality of ATM flows corresponding to non-realtime traffic is less than or equal to a maximum capacity of the computer system.

14. The computer-readable medium of claim 13, wherein the portion of the plurality of ATM cells is transmitted based upon a transmission fraction between zero and one and wherein gracefully increasing the portion of the plurality of ATM cells further includes:
  linearly increasing the transmission fraction towards one.

15. The computer-readable medium of claim 14, wherein the excess bandwidth is determined over a refresh period, the excess bandwidth being represented by an excess bandwidth signal, and wherein linearly increasing the transmission fraction further includes:
  adding a product of an exponentially weighted moving average of the excess bandwidth signal and a constant for the plurality of ATM cells to the transmission fraction for a previous refresh period.

16. The computer-readable medium of claim 13, wherein the program further includes computer-executable instructions for:
  gracefully decreasing the portion of the plurality of ATM cells transmitted if the excess bandwidth does not exist.

17. The computer-readable medium of claim 16, wherein the portion of the plurality of ATM cells is transmitted based upon a transmission fraction between zero and one, and wherein gracefully decreasing the portion of the plurality of ATM cells further includes:
  exponentially decreasing the transmission fraction towards zero by subtracting a term from a previous transmission fraction of a previous refresh period to obtain a current transmission fraction for a current refresh period.

18. The computer-readable medium of claim 17, wherein the excess bandwidth is determined over a refresh period, the excess bandwidth being represented by an excess bandwidth signal, and wherein exponentially decreasing the transmission fraction further includes:
  computing the term by multiplying a constant and a ratio of an observed transmitted rate for the previous refresh period divided by a constant physical limit that any of the plurality of ATM flows could attain.

19. The computer-readable medium of claim 13, wherein the computer system includes at least one queue and wherein determining whether excess bandwidth exists further includes:
  utilizing a queue occupancy and a rate of change of queue occupancy to determine whether excess bandwidth exists.

20. The computer-readable medium of claim 13, wherein the computer system includes a queue and wherein determining whether excess bandwidth exists further includes:
  determining excess bandwidth exists if the queue is less than a particular occupancy level.

21. The computer-readable medium of claim 13, wherein the program further includes computer-executable instructions for:
  increasing the portion of the plurality of ATM cells transmitted if the portion of the plurality of ATM cells transmitted is less than the minimum ATM bandwidth guarantee and the plurality of ATM cells present the sufficient offered load.

22. The computer-readable medium of claim 13, wherein the program further includes computer-executable instructions for:
decreasing the portion of the plurality of ATM cells transmitted if the portion of the plurality of ATM cells transmitted is greater than the maximum ATM bandwidth limit.

23. The computer-readable medium of claim 13, wherein outputting the portion of the plurality of ATM cells further includes:
selecting an ATM cell from the second queue only if the first queue is empty.

24. The computer-readable medium of claim 13, wherein each of the plurality of ATM flows have a corresponding priority and wherein outputting the portion of the plurality of ATM cells further includes:
outputting the portion of the plurality of ATM cells based upon the corresponding priority.

25. A system for managing asynchronous transfer mode (ATM) traffic in a computer system, the computer system used in sending, receiving, or sending and receiving a plurality of ATM flows, each of the plurality of ATM flows having a plurality of ATM cells, the system comprising:
at least one queue for use in transmitting traffic through the network;
an enqueueing mechanism for
determining whether excess bandwidth exists for the plurality of ATM flows, each of the plurality of ATM flows having a minimum ATM bandwidth guarantee and a maximum ATM bandwidth limit, and
gracefully increasing a portion of the plurality of ATM cells transmitted for each ATM flow having excess bandwidth,
for each ATM flow having excess bandwidth, the portion of the plurality of ATM cells transmitted is not more than the maximum ATM bandwidth limit of the ATM flow and, responsive to the plurality of ATM cells presenting a sufficient offered load, the portion of the plurality of ATM cells transmitted is not less than the minimum ATM bandwidth guarantee of the ATM flow; and
a scheduler for outputting the portion of the plurality of ATM cells transmitted for each ATM flow having excess bandwidth, wherein
each of the plurality of ATM flows corresponds to realtime traffic or non-realtime traffic, for each ATM flow having excess bandwidth, the portion of the plurality of ATM cells are transmitted to a first queue for the realtime traffic or a second queue for the non-realtime traffic, and
a first sum of the maximum ATM bandwidth limit for each of the plurality of ATM flows corresponding to realtime traffic plus a second sum of the minimum ATM bandwidth guarantee for each of the plurality of ATM flows corresponding to non-realtime traffic is less than or equal to a maximum capacity of the computer system.

26. The system of claim 25, wherein the portion of the plurality of ATM cells is transmitted based upon a transmission fraction between zero and one and wherein the enqueueing mechanism gracefully increases the portion of the plurality of ATM cells by linearly increasing the transmission fraction towards one.

27. The system of claim 26, wherein the excess bandwidth is determined over a refresh period, the excess bandwidth being represented by an excess bandwidth signal, and wherein the enqueueing mechanism linearly increases the transmission fraction by adding a product of an exponentially weighted moving average of the excess bandwidth signal and a constant for the plurality of ATM cells to the transmission fraction for a previous refresh period.

28. The system of claim 25, wherein the enqueueing mechanism further gracefully decreases the portion of the plurality of ATM cells transmitted if the excess bandwidth does not exist.

29. The system of claim 28, wherein the portion of the plurality of ATM cells is transmitted based upon a transmission fraction between zero and one, and wherein enqueueing mechanism gracefully decreases the portion of the plurality of ATM cells transmitted by exponentially decreasing the transmission fraction towards zero by subtracting a term from a previous transmission fraction of a previous refresh period to obtain a current transmission fraction for a current refresh period.

30. The system of claim 29, wherein the excess bandwidth is determined over a refresh period, the excess bandwidth being represented by an excess bandwidth signal, and wherein the enqueueing mechanism computes the term by multiplying a constant and a ratio of an observed transmitted rate for the previous refresh period divided by a constant physical limit that any of the plurality of ATM flows could attain.

31. The system of claim 25, wherein the enqueueing mechanism determines whether excess bandwidth exists by utilizing a queue occupancy and a rate of change of queue occupancy to determine whether excess bandwidth exists.

32. The system of claim 25, wherein the enqueueing mechanism determines that excess bandwidth exists if the queue is less than a particular occupancy level.

33. The system of claim 25, wherein the enqueueing mechanism further increases the portion of the plurality of ATM cells transmitted if the portion of the plurality of ATM cells transmitted is less than the minimum ATM bandwidth guarantee and the plurality of ATM cells present the sufficient offered load.

34. The system of claim 25, wherein the enqueueing mechanism further decreases the portion of the plurality of ATM cells transmitted if the portion of the plurality of ATM cells transmitted is greater than the maximum ATM bandwidth limit.

35. The system of claim 25, wherein the scheduler selects an ATM cell from the second queue only if the first queue is empty.

36. The system of claim 25, wherein each of the plurality of ATM flows have a corresponding priority and wherein the scheduler outputs the portion of the plurality of ATM cells based upon the corresponding priority.

* * * * *